United States Patent [19]
Edelstein

[11] 3,899,246
[45] Aug. 12, 1975

[54] COMBINED MICROFICHE READER AND PROJECTOR
[75] Inventor: Arthur Edelstein, Jamaica, N.Y.
[73] Assignee: Bell & Howell Company, Chicago, Ill.
[22] Filed: June 18, 1973
[21] Appl. No.: 371,218

Related U.S. Application Data
[63] Continuation of Ser. No. 133,294, April 12, 1971, abandoned.

[52] U.S. Cl. .................. 353/27; 353/72; 353/78
[51] Int. Cl. .................. G03b 23/08; G03b 21/30
[58] Field of Search .................. 353/25–27, 353/74–78, 72, 73

[56] References Cited
UNITED STATES PATENTS
2,150,992  3/1939  Scott .................... 353/78
3,650,614  3/1972  Shimoda ................. 353/72
3,667,839  6/1972  Artaud .................. 353/77
3,700,321  10/1972 Peters ................... 353/78

Primary Examiner—Richard E. Aegerter
Assistant Examiner—A. J. Mirabito
Attorney, Agent, or Firm—Robert A. Walsh; Gerald B. Epstein

[57] ABSTRACT

A combined microfiche reader and projector, book-like in size, weight, reading and handling characteristics in which a two part telescopically interfitting housing incorporates a microfiche projection system, a screen to display the projected image, and a single thumb operated control for full omni-directional right reading movement of the microfiche.

8 Claims, 10 Drawing Figures

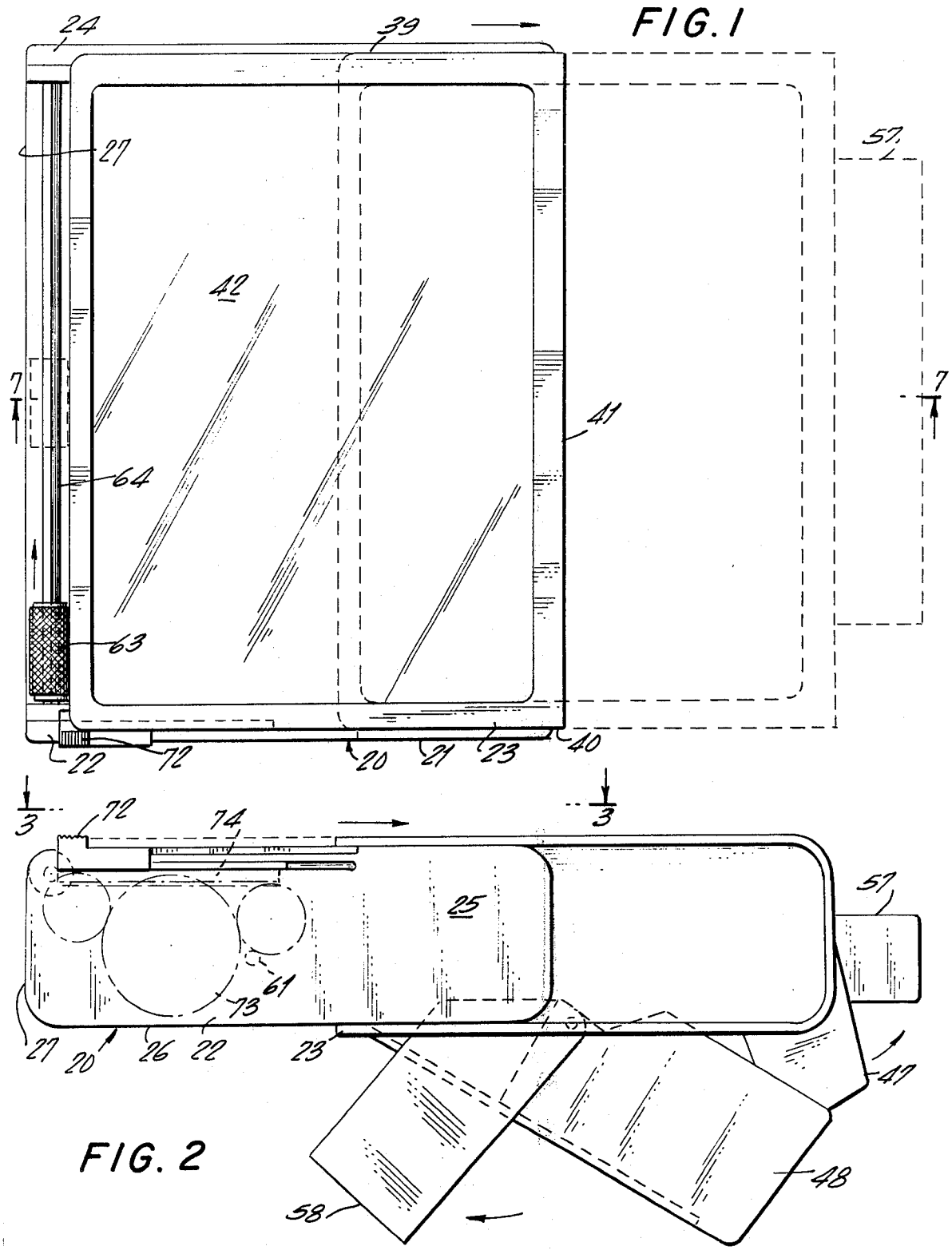

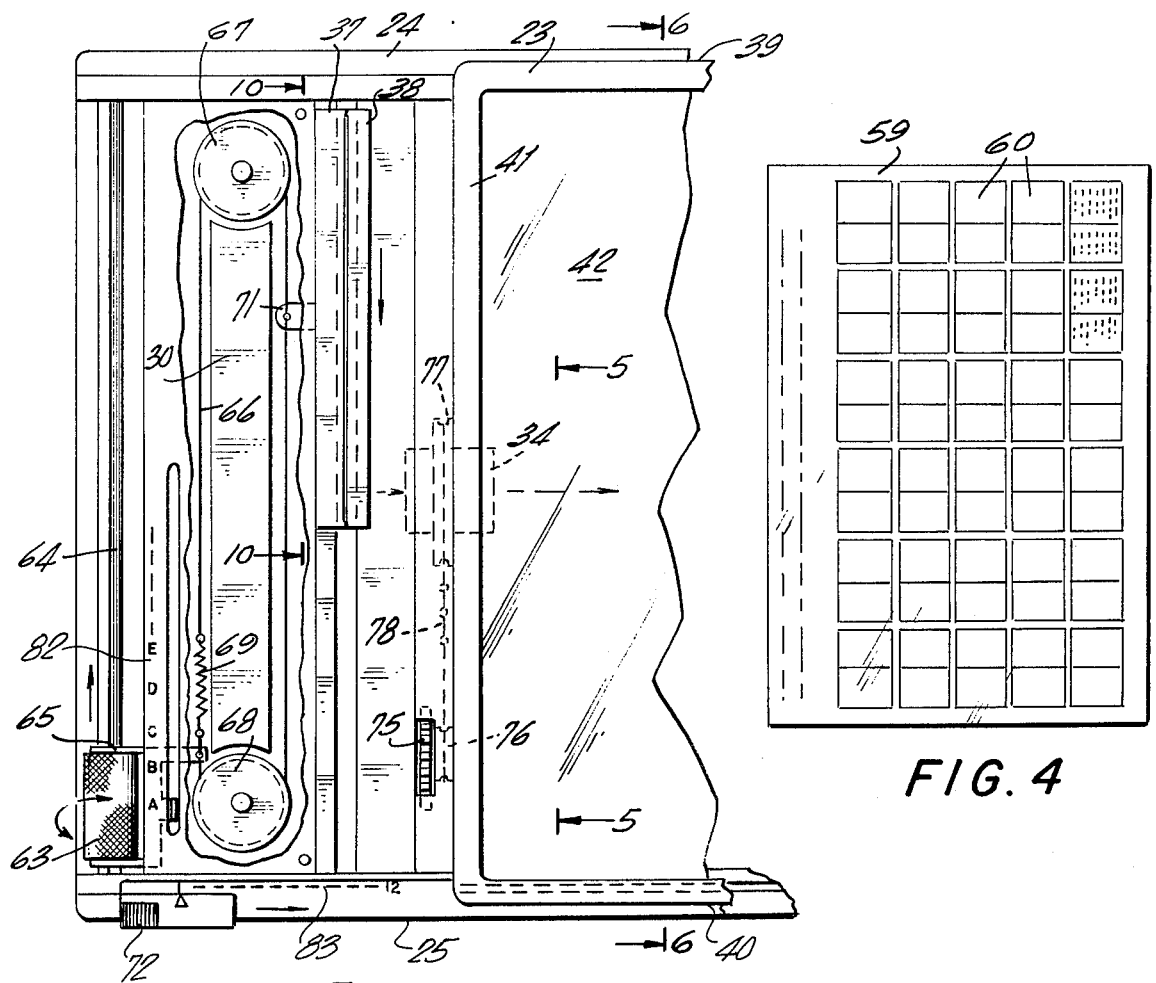
FIG. 3
FIG. 4
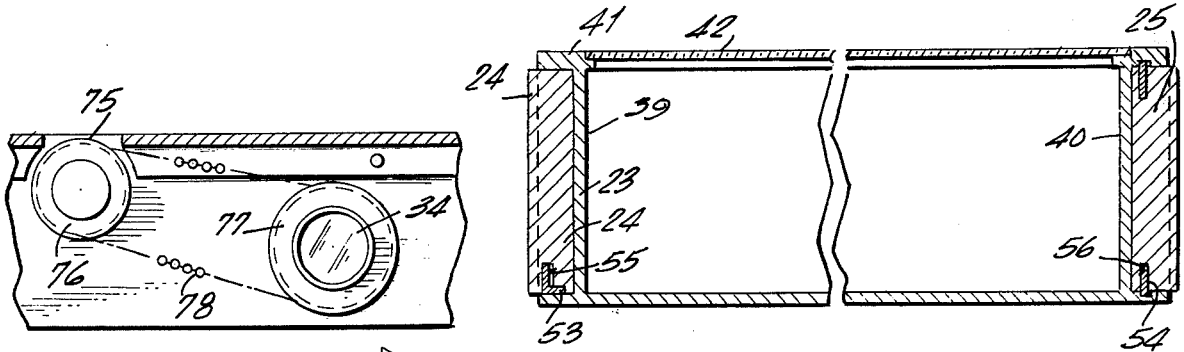
FIG. 5
FIG. 6
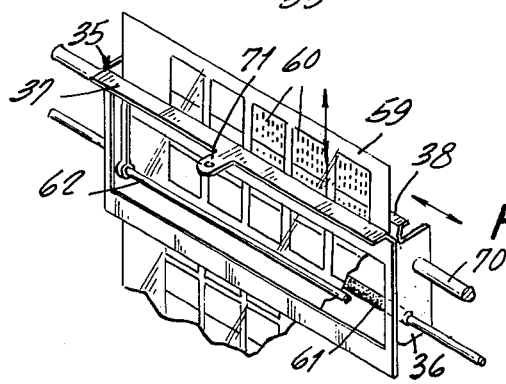
FIG. 10
INVENTOR
ARTHUR EDELSTEIN
ATTORNEY

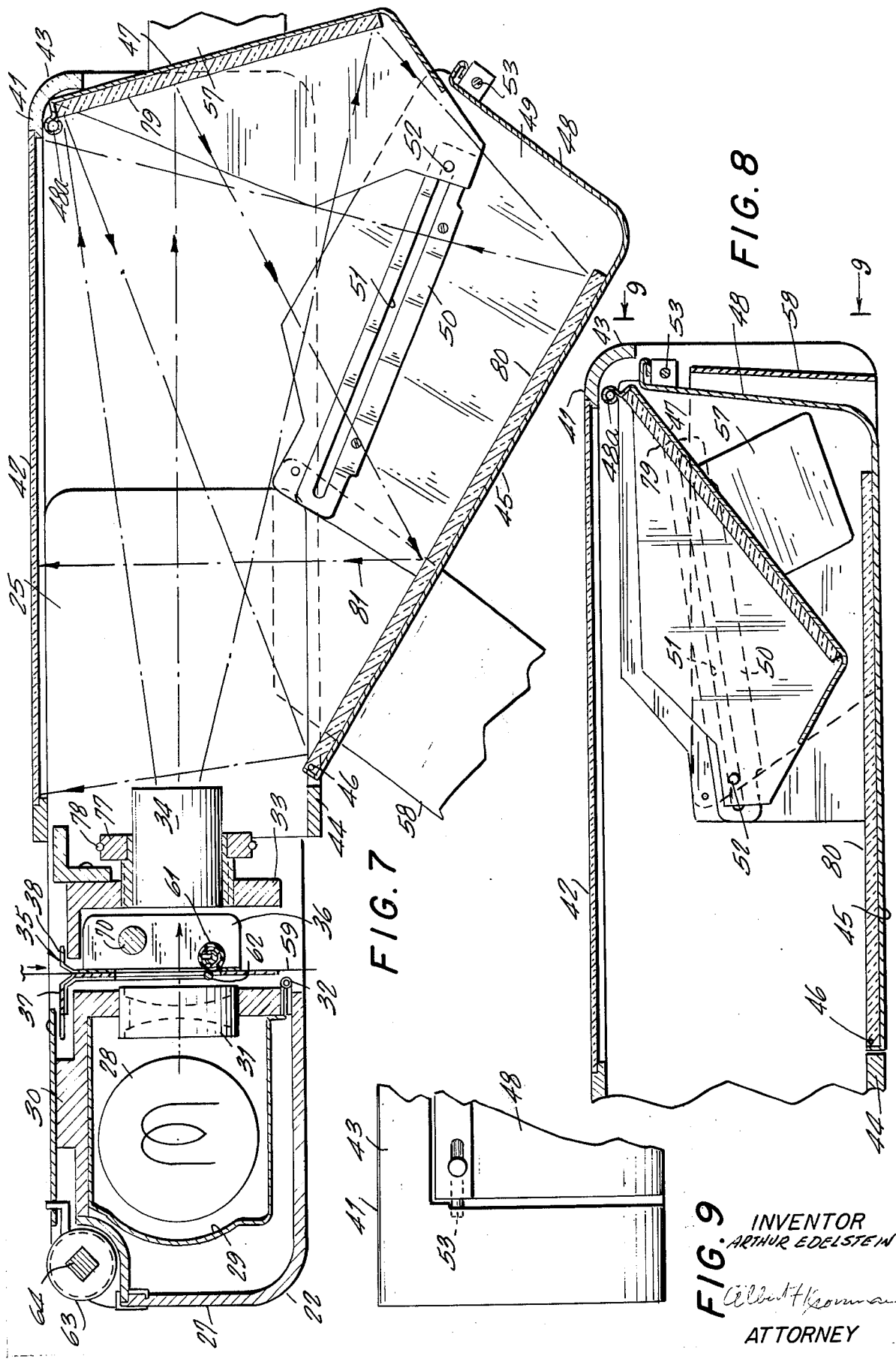

COMBINED MICROFICHE READER AND PROJECTOR

This is a continuation of application Ser. No. 133,294 filed Apr. 12, 1971, and now abandoned

BACKGROUND OF THE INVENTION

It is well known to project microform information or indicia upon a screen for the purpose of display. Presently known projection devices useful for this purpose are bulky and expensive. They are moreover of a size which makes it necessary for them to be located at a fixed station where they must be used.

During use, the prior art devices, require such a substantial adjustment in viewing, microfiche control and indexing as to cause great discomfort. In effect the reader's attention is constantly being directed to the projector instead of the material to be read. Shifting from one frame to another in prior art devices calls for careful manipulation of unfamiliar controls and often an eye fatiguing refocusing operation.

Accordingly, it is an object of the present invention to provide a microform reader which is free of the shortcomings of presently known devices.

Another object of the present invention is to provide a microform reader which is book-like in size, weight, handling properties, portability and reading legibility.

A further object of the present invention is to provide a microform reader which can be operated by a single thumb controlled member so designed that very little instruction is required before the user becomes an adept operator.

Still another object is to provide a microform reader in which the frame indexing controls are direct and right reading so that use of the reader shortly becomes automatic.

An object of the present invention is to provide a microform reader which will accept a variety of microform or microfiche material.

Another object of the present invention is to provide a microform reader in which the image appearing upon the reading screen may be enlarged if necessary by a simple adjustment of the two part housing.

The above and other objects and features will become apparent from the following general description.

SUMMARY OF THE INVENTION

The present invention consist of an extremely compact book-like microform reader and projector. Operation of the reader is accomplished by inserting a sheet, roll or card of microform material into a slot in the front of the reader and thereafter moving the sheet in any desired direction by means of a single thumb actuated control. The reader and projector is preferably contained within a two part housing, the two members of which are telescopically arranged. The first housing member hereinafter the "fixed housing" contains the light source, microform receiving station and a single optical projection system. The second housing member hereinafter the "moveable housing" is constructed so as to provide two mirrors swingably mounted with respect to each other and the housing and a screen member to receive light reflected from the said mirrors. Light from the optical system is directed at a first mirror which reflects the said image onto a second mirror from which it is directed upon a rear projection screen forming one face of the moveable housing. The final projection results in substantial enlargement of the image projected through the optical system. The arrangement of the optical system is such that by shifting the movable housing away from the fixed housing, the projected image may be enlarged upon the screen. By removing the moveable housing member entirely from the fixed housing there is provided a direct image projector which may be used for larger audiences.

DESCRIPTION OF THE DRAWINGS

In the accompanying drawings forming part hereof there is illustrated one complete embodiment of the present invention in which drawings similar parts have been given identical reference numerals and in which:

FIG. 1 is a view in front elevation of the microfiche reader and projector with the housing members closed for portability.

FIG. 2 is a bottom view of the microfiche reader and projector shown in FIG. 1 in the open or operative position.

FIG. 3 is a somewhat fragmentary view taken on line 3—3 in FIG. 2 looking in the direction of the arrows.

FIG. 4 is a view in front elevation of a microfiche card such as is used in the combined reader and projector described and shown herein.

FIG. 5 is a fragmentary view taken on line 5—5 of FIG. 3 looking in the direction of the arrows.

FIG. 6 is a fragmentary view taken on line 6—6 in FIG. 3 looking in the direction of the arrows.

FIG. 7 is a cross sectional view taken on line 7—7 in FIG. 1 looking in the direction of the arrows.

FIG. 8 is a fragmentary view showing the manner in which the housing elements are interfolded when not in use.

FIG. 9 is a fragmentary view taken on line 9—9 looking in the direction of the arrows.

FIG. 10 is a somewhat isometric view taken on line 10—10 of FIG. 3 looking in the direction of the arrows.

GENERAL DESCRIPTION

Referring to the drawings and particularly FIG. 1, the combined microfiche reader and projector 20 is contained within a hollow two part housing 21 formed of metal, plastic or some suitable rigid material. The two part housing 21 consists of a fixed housing 22 upon which there is telescopically received a moveable housing 23. The fixed housing 22 comprises a top wall 24, a bottom wall 25 spaced from the top wall and parallel thereto, a rear wall 26 and a side wall 27 integral with the rear wall 26.

A projection lamp 28 is carried within the fixed housing 22 as shown in FIG. 7. The lamp 28 is provided with a reflector 29 mounted between the lamp 28 and the housing 22. The reflector 29 is positioned so that light from the lamp is directed through a condensing lens 31 carried by a combined lens mount and cover plate 30. The lens mount and cover plate 30, as shown in FIG. 7 is "L" shaped in cross section and serves both to cover the front of the fixed housing 22 and the projection lamp compartment while providing a vertical support for the condenser 31. The lens mount and cover member 30 is hinged as indicated at 32 to provide access to the projection lamp 28.

The top and bottom walls 24, 25, of the fixed housing 22 extend outwardly in the direction of the moveable housing 23 and beyond the rear wall 26 to provide guides upon which the moveable housing 23 can slide. A second lens mount 33 is secured at each end to the top and bottom walls 24, 25 in a position which is spaced from but parallel to the condenser lens mount. The projection lens 34 of the system is carried by the second lens mount 33 and is threaded therein in the well known menner so that rotation of the said projection lens will permit focusing of the system.

A microfilm or microfiche holder 35 is secured by means of a bracket 36 to the top and bottom walls 24, 25 and disposed between the lenses 31, 34. The microfiche holder 35 consists of opposed plates 37, 38 between which the microfiche card is received in a manner hereinafter more fully set forth.

The moveable housing 23 comprises a top wall 39, a bottom wall 40 and a front wall 41 in which there is carried a rear projection screen 42. A short side wall 43 integral with the front wall 41 partially encloses one side of the moveable housing 23. A panel 44 partially encloses the rear of the moveable housing 23. As best shown in FIG. 7, the moveable housing is thus provided with side and rear openings through which swingable mirror mounts 45, 47 may move. The first mirror mount 47 is swingably secured between the top and bottom walls 39, 40 as shown at 48a. The second swingable mirror mount 45 is pivoted at 46 as shown in FIG. 7 between the top and bottom walls 39, 40.

When the two mirror mounts 45, 47 are in the closed position as shown in FIG. 8, they serve to complete the rear and side walls of the moveable housing 23. During the operation of the microfiche reader, the moveable housing is laterally disclaced with respect to the fixed housing as shown in dashed lines in FIG. 1 and in full lines in FIG. 7. The swingable mirror mounts 45, 47 are then free to move outwardly as illustrated in FIG. 7 to enclose a larger volume and provide for a longer folded light path as indicated by the arrows in FIG. 7. The mirror mount 45 is provided with upstanding walls 49 to which are secured elongated brackets 50. The brackets 50 are provided with slots 51 within which a pin 52, carried by the mirror mount 47, may travel. In this manner the specific relationship between the mirror mounts 45, 47 is maintained and the two members are positively linked together, at all times.

The mirror mounts 45, 47, in the closed position, are securely locked in place by means of spring loaded latch 53 best shown in FIG. 9.

The manner in which the moveable housing 23 is carried upon the outwardly extending top and bottom walls 24, 25 is best shown in FIG. 6. The spaced top and bottom walls 24, 25 are provided with grooves 53, 54 which receive track members 55, 56 carried by the top and bottom walls 39, 40 of the moveable housing 23. This construction provides for a smooth and positive telescopic movement between the fixed and moveable housings. The moveable housing 23 is further constructed with handles 57, 58 which serve to regulate the position of the moveable housing and also act as a stand if desired. The stand holds the housing upon a surface in the manner of a book stand for easy reading.

A microfiche card 59, such as shown in FIG. 4 consisting of a plurality of discreet microform images 60 is received in the microfiche holder 35 between the plates 37, 38. The bottom of the microfiche card 59 is grasped between a roller 61 (see FIG. 7) and a spring loaded bar 62. The roller 61 is covered with rubber or some material having a high coefficient of friction (see FIG. 10). Since the housing 22 is cut away at its back beneath the holder 35, microform material in a wide variety of shapes and sizes can be used in the present device. These include, film strips, aperture cards, ultrafiche etc. By using a microfiche card in the manner shown, in which the shortest dimension is normal to the longitudinal travel, a practical reader having the smallest size that will project all images on the screen has been achieved. For example, if a 3 × 5 inch microfiche card were the maximum size used it is possible with this invention to produce a reader only 6 inches tall (plus mechanical requirements). The microfiche mechanism does not extend beyond the housing and consequently the reader may be used on a lap in the manner of a book.

The desired frame 60 on the microfiche card 59 is selected by operation of the unique control 63 (shown in FIG. 3). The control 63 is slidably carried upon an elongated square rod 64 in such manner that it can be slid lengthwise of the rod, but is nevertheless keyed thereto for rotation with the rod. In this manner the user can move the microfiche or microform material vertically or horizontally with a single control responsive to the thumb. While vertical and horizontal alignment is positively maintained as compared with prior art devices, the reader can skew the movement of the microfiche, if desired. Skewing is accomplished by a simultaneous shifting and rotating of the control 63 and is useful where maps, drawings etc are to be viewed.

A small outwardly extending tab 65 is secured to the control 63 and extends inwardly as best shown in FIG. 3. The tab 65 has attached thereto a thin belt 66 which is led around pulleys 67, 68 freely mounted upon the combined cover and lens mount 30. The belt 66 is kept in good frictional contact with the pulleys 67, 68 by means of a small coil spring 69. The entire microfilm holder 35, as best shown in FIG. 10 is mounted upon a rod 70 and free to slide thereon. Sliding motion to the microfiche holder 35 is provided by attaching the holder 35 to the belt 66 by means of a small arm 71. In this manner, the microfiche card 59 can be moved horizontally for the purpose of selecting the proper frame 60. When it is desired to raise or lower the card in the selection of individual frames, the control 63 is rotated as indicated by the arrows in FIG. 3. Rotation of the control 63 operates through the gear train 73, indicated in dashed lines in FIG. 2, to turn the roller 61. The roller 61, being covered by a resilient material, frictionally raises and lowers the microfiche card 59.

In the event that it is desired to rapidly raise or lower the microfiche card 59, the operator merely moves the button 72 provided at the lower left hand corner of the microfiche reader adjacent the periphery of the reader. The button 72 is secured to a gear rack 74 indicated in dashed lines in FIG. 2. The gear rack 74 is in mesh with the gear train 73 to impart a rapid advance to the microfiche card in the well known manner.

Rapid setting of the microfiche can be accomplished by moving the control 63 and the button 72 to the proper point on the scales 82, 83 adjacent thereto. Since both the control 63 and the button 72 are located adjacent the periphery of the housing they can be thumb operated without removing the hands from the device.

Light traversing the condenser lens 31 is directed through the selected microfiche frame 60 into the projection lens 34. If necessary, the projection lens 34 may be focused by rotating it. Rotation of the lens 34 is achieved by turning the focusing knob 75 (see FIG. 3 and 5) which is part of a small pulley 76. The pully 76 is coupled to a second pulley 77 mounted upon the lens 34 as shown in FIG. 7. The pulleys 76, 77 are operatively connected by means of a drive chain 78 whereby rotation of the focusing knob 75 will turn the projection lens 34.

Light coming from the projection lens 34 is directed upon a first mirror 79 carried by the first mirror mount 47. In the operating position shown in FIG. 7, the first mirror is angularly disposed with respect to the optical axis of the lens 34 and therefore reflects the image projected thereon downwardly and at an angle upon the face of a second mirror 80 carried by the second mirror mount 45. As shown by the arrows 81 indicating the folded light path within the housing 21, the light reflected from the mirror 80 is directed upwardly to the rear surface of the rear projection screen 42 from which it may be viewed by the user of the microfiche reader.

The light path 81 can be lengthened or shortened within the travel of the moveable housing 23 upon the fixed housing 22 by telescopically sliding the housings with respect to each other. As the light path is lengthened, the magnification will be increased upon the screen 42. On the other hand, should it be desired to increase the magnification beyond the possible length of the light path within the housing 21, the moveable housing 23 can be completely removed from the fixed housing 22, in which event, the light coming from the projection lens 34 may be directed upon any surface such as a wall or even the ceiling. In this event, the microfiche reader operates as a projector wherein the size of magnification is related to the distance of the projector from the screen upon which the image is focused.

From the foregoing it will be seen that there has been provided an extremely compact microfiche reader in which a folded light path has been employed to provide substantial magnification within a small envelope so that the overall device is of a size of the order of a book. The reader can be conveniently hand held, carried about, and used in the manner that one might use a book. The reader is capable of a wide range of magnification which lends itself to extremely small microform indicia. In addition, the reader can be used as a projector to provide substantial magnification. The controls for the operation of the reader are all convenient to the left hand of the user and rapid, accurate transport of the microfiche card is possible to facilitate use. In the event right hand operation is desired the microform material can be turned 180° inserted and the reader similarly rotated for reading.

The direct right reading nature of the microfiche control mechanism makes it possible for the user to become adept at handling the reader in a very short period of time so that full attention can be given to the screen. The transition from book reading to the present device is therefore made with ease since control functions and reading mind functions are coordinated.

It will be apparent that the present device can be made with a non-telescopic housing and fixed mirrors without departing from the spirit of the invention.

Having thus fully described the invention, what is claimed as new and desired to be secured by Letters Patents of the United States, is:

1. A combined microfiche reader and projector system, book-like in size and handling characteristics comprising a first fixed hollow housing, and a second movable housing slidably and telescopically coupled therewith and being telescopically movable between a first inoperative position, and a second operative position, said second housing being selectively disengageable from said first housing to permit use of said system as a projector adapted to form images on a remote surface, a projection lamp compartment within the first housing, a projection lamp in said compartment for connection to a power source, a reflector carried within the projection lamp compartment to direct the light from the projection lamp through the housings, a projection lens assembly carried by the first housing to receive the light from the projection lamp, a first mirror within the second housing adapted to receive light coming from the projection lens assembly when said first and second housing are in engagement with each other, means to hold the said first mirror at an angle with respect to the optical axis of the projection lens assembly, a second mirror swingably carried by the second housing to receive light reflected by the first mirror only when said second housing is in its second operative position, means to hold the said second mirror at an angle with respect to the plane of the first mirror, a rear projection screen stationarily mounted within and carried by the second housing to receive light reflected by the second mirror, means to hold a microfiche card between the lamp and the projection lens assembly and means adjacent the periphery of the fixed housing to move the microfiche card within the housing to bring selected areas of the said card into register with the projection lens assembly, wherein the first mirror is carried upon a first mirror mount swingably secured to the side of the second movable housing adjacent the side wall thereof, the second mirror is carried upon a second mirror mount swingably secured to the side walls of the second movable housing adjacent the rear thereof, said mirror mounts being operatively coupled together adjacent their free ends and being movable responsive to telescoping movement of said second housing between its first and second positions.

2. A device according to claim 1 in which the fixed housing is provided with a first lens mount disposed adjacent the projection lamp and between the said lamp and the moveable housing, a condenser lens carried in the lens mount, a second lens mount spaced from the first lens mount, a projection lens threadably received in said second lens mount, said projection lens adapted to receive light coming from the condenser lens and direct it upon the first mirror and means to rotate the projection lens within the second lens mount to focus the projection system.

3. A device according to claim 2 in which the projection lens is focused by a first pulley secured to the said lens, a second pulley spaced from the first pulley, belt interconnecting said pulleys and means to rotate the second pulley to rotate the projection lens within the support plate.

4. A microfiche reader according to claim 1 in which the microfiche moving means is disposed along the periphery of the fixed housing opposite the second housing.

5. A combined microfiche reader and projector system, book-like in size and handling characteristics comprising a first fixed hollow housing, and a second movable housing slidably and telescopically coupled therewith and being telescopically movable between a first inoperative position, and a second operative position, said second housing being selectively disengagable from said first housing to permit use of said system as a projector adapted to form images on a remote surface, a projection lamp compartment within the first housing, a projection lamp in said compartment for connection to a power source, a reflector carried within the projection lamp compartment to direct the light from the projection lamp through the housings a projection lens assembly carried by the first housing to receive the light from the projection lamp, a first mirror within the second housing adapted to receive light coming from the projection lens assembly when said first and second housing are in engagement with each other, means to hold the said first mirror at an angle with respect to the optical axis of the projection lens assembly, a second mirror swingably carried by the second housing to receive light reflected by the first mirror only when said second housing is in its second operative position, means to hold the said second mirror at an angle with respect to the plane of the first mirror, a rear projection screen stationarily mounted within and carried by the second housing to receive light reflected by the second mirror, means to hold a microfiche card between the lamp and the projection lens assembly and means adjacent the periphery of the fixed housing to move the microfiche card within the housing to bring selected areas of the said card into register with the projection lens assembly, wherein the microfiche card holding means comprises spaced plates to receive the said card therebetween, an elongated rod secured at each end to the top and bottom walls of the fixed housing and freely supporting at least one of the spaced plates thereon for longitudinal movement, a spring loaded bar carried by the plates adapted to bear against one side of the said card, and a friction roller carried by the plates, adapted to bear against the side of the said card opposite the spring loaded bar.

6. A device according to claim 5 in which the mirror mounts are coupled by means comprising a bracket having an elongated slot therein carried by one of said mirror mounts, and a pin slidably received within the said slot and are swingable from a position conforming to a rectangular housing outline to a position outwardly of said rectangular outline.

7. A device according to claim 5 in which the microfiche card moving means comprises an elongated square rod carried by the housing adjacent one peripheral side thereof, a control member slidably carried upon the square rod, an outwardly extending arm coupled to the control member and longitudinally moveable therewith, spaced pulleys freely secured to the housing adjacent the elongated rod, a belt operatively connecting said pulleys, means to connect the outwardly extending arm to the belt, means to connect the belt to the microfiche card holding means whereby longitudinal motion imparted to the control member is translated into a corresponding longitudinal travel of the microfiche card holding means along its longitudinal support rod.

8. A device according to claim 7 in which the elongated square rod is provided with a gear secured to one end thereof, a gear train in mesh with the square rod gear is carried by the housing and the friction roller is driven by the gear train whereby rotary motion imparted to the control member is translated into vertical movement of the microfiche card within the plates.

* * * * *